United States Patent
Li et al.

(10) Patent No.: US 11,200,883 B2
(45) Date of Patent: Dec. 14, 2021

(54) IMPLEMENTING A DOMAIN ADAPTIVE SEMANTIC ROLE LABELER

(71) Applicant: International Business Machines Corporation, Armonk, NY (US)

(72) Inventors: Yunyao Li, San Jose, CA (US); Huaiyu Zhu, Fremont, CA (US); Honglei Zhuang, Fremont, CA (US); Sanjana Sahayaraj, Chennai (IN); Chenguang Wang, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 126 days.

(21) Appl. No.: 16/740,115

(22) Filed: Jan. 10, 2020

(65) Prior Publication Data
US 2021/0217405 A1  Jul. 15, 2021

(51) Int. Cl.
| G10L 15/05 | (2013.01) |
| G10L 15/08 | (2006.01) |
| G10L 15/10 | (2006.01) |
| G06N 20/00 | (2019.01) |
| G10L 15/06 | (2013.01) |

(52) U.S. Cl.
CPC ............. G10L 15/05 (2013.01); G06N 20/00 (2019.01); G10L 15/063 (2013.01); G10L 15/083 (2013.01); G10L 15/10 (2013.01); G10L 2015/088 (2013.01)

(58) Field of Classification Search
CPC ..... G10L 15/05; G10L 15/063; G10L 15/083; G10L 15/10; G06N 20/00; G06N 3/08
USPC ........................................................ 704/251
See application file for complete search history.

(56) References Cited

U.S. PATENT DOCUMENTS

| 8,520,808 | B2* | 8/2013 | Dayanidhi | ............. G10L 15/01 |
| | | | | 379/88.04 |
| 8,560,477 | B1 | 10/2013 | Petrov et al. | |
| 8,832,064 | B2* | 9/2014 | Stenchikova | ......... G06F 16/951 |
| | | | | 707/708 |
| 10,242,292 | B2* | 3/2019 | Zisimopoulos | ........ G06N 20/00 |
| 10,296,846 | B2 | 5/2019 | Csurka et al. | |

(Continued)

FOREIGN PATENT DOCUMENTS

CN  109902798 A  6/2019

OTHER PUBLICATIONS

Xiao et al., "Domain Adaptation for Sequence Labeling Tasks with a Probabilistic Language Adaptation Model," Proceedings of the 30th International Conference on Machine Learning, JMLR: W&CP, vol. 28, 2013, 9 pages.
Sun et al., "A Two-Stage Weighting Framework for Multi-Source Domain Adaptation," Advanced in Neural Information Processing Systems 24 (NIPS), 2011, pp. 1-9, retrieved from http://papers.nips.cc/paper/4195-a-two-stage-weighting-framework-for-multi-source-domain-adaptation.

(Continued)

Primary Examiner — Susan I McFadden
(74) Attorney, Agent, or Firm — Zilka-Kotab P.C.

(57) ABSTRACT

A computer-implemented method according to one embodiment includes identifying features of a plurality of data instances within a target domain; assigning weights to the plurality of data instances within the target domain, based on similarities among the features; selecting a subset of the plurality of data instances within the target domain, based on the weights; associating expert annotations with respective ones of data instances within the subset; and training a machine learning algorithm, utilizing the subset of the plurality of data instances and associated expert annotations.

21 Claims, 7 Drawing Sheets

(56) References Cited

U.S. PATENT DOCUMENTS

| | | | |
|---|---|---|---|
| 10,402,501 B2* | 9/2019 | Wang | G10L 15/22 |
| 10,453,444 B2* | 10/2019 | Zitouni | G06N 20/00 |
| 10,496,898 B2* | 12/2019 | Zisimopoulos | G06N 3/08 |
| 10,599,700 B2* | 3/2020 | Davulcu | G06F 40/247 |
| 10,643,320 B2* | 5/2020 | Lee | G06T 7/149 |
| 10,839,154 B2* | 11/2020 | Galitsky | G06F 40/30 |
| 10,861,437 B2* | 12/2020 | Chatterjee | G10L 15/02 |
| 10,977,452 B2* | 4/2021 | Wang | G06F 16/90332 |
| 10,977,573 B1* | 4/2021 | Dalton | G06F 16/80 |
| 11,042,778 B2* | 6/2021 | Bonakdar Sakhi | G16H 50/50 |
| 2016/0078359 A1 | 3/2016 | Csurka et al. | |
| 2016/0253597 A1 | 9/2016 | Bhatt et al. | |
| 2017/0147944 A1 | 5/2017 | Csurka et al. | |

OTHER PUBLICATIONS

Do et al., "Domain Adaptation in Semantic Role Labeling Using a Neural Language Model and Linguistic Resources," IEEE/ACM Transactions on Audio, Speech, and Language Processing, vol. 23, No. 11, Nov. 2015, pp. 1812-1823.

Chou et al., "A Semi-Automatic Method for Annotating a Biomedical Proposition Bank," Proceedings of the Workshop on Frontiers in Linguistically Annotated Corpora, 2006, pp. 5-12.

Akbik et al., "K-SRL: Instance-based Learning for Semantic Role Labeling," Proceedings of COLING, the 26th International Conference on Computational Linguistics: Technical Papers, Dec. 11-17, 2016, pp. 599-608.

\* cited by examiner

FIG. 7

IMPLEMENTING A DOMAIN ADAPTIVE SEMANTIC ROLE LABELER

BACKGROUND

The present invention relates to semantic role labeling (SRL), and more specifically, this invention relates to training an SRL model within a sparse data domain.

Semantic role labeling (SRL) is an important component of natural language processing (NLP). For example, SRL may annotate predicate argument structures in sentences. Currently, however, SRL does not perform well within sparse data domains where little training data are available.

SUMMARY

A computer-implemented method according to one embodiment includes identifying features of a plurality of data instances within a target domain; assigning weights to the plurality of data instances within the target domain, based on similarities among the features; selecting a subset of the plurality of data instances within the target domain, based on the weights; associating expert annotations with respective ones of data instances within the subset; and training a machine learning algorithm, utilizing the subset of the plurality of data instances and associated expert annotations.

According to another embodiment, a computer program product for implementing a domain adaptive semantic role labeler includes a computer readable storage medium having program instructions embodied therewith, where the computer readable storage medium is not a transitory signal per se, and where the program instructions are executable by a processor to cause the processor to perform a method including identifying, utilizing the processor, features of a plurality of data instances within a target domain; assigning, utilizing the processor, weights to the plurality of data instances within the target domain, based on similarities among the features; selecting, utilizing the processor, a subset of the plurality of data instances within the target domain, based on the weights; associating, utilizing the processor, expert annotations with respective ones of data instances within the subset; and training, utilizing the processor, a machine learning algorithm, utilizing the subset of the plurality of data instances and associated expert annotations.

According to another embodiment, a computer-implemented method includes calibrating source domain data, thereby providing an indication of the degree of relevance of each data point to a target domain, by assigning weights to instances in the source domain according to how well they agree with corresponding usage in the target domain; assigning weights for source domain instances having overlapping features with target domain instances; assigning weights for source domain instances by propagating weights from other source domain instances sharing similar features; actively selecting target specific data for human annotation by selecting a subset of unlabeled target domain data that cover unseen features in labeled data, are associated with more data instances in target domain data, and are not redundant with source domain training data; requesting that annotators label the selected target specific data; combining the calibrated source domain data and labeled target specific data, thereby forming combined training data that are suitable for training a semantic role labeler (SRL); and training the SRL on the combined training data.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for implementing a domain adaptive semantic role labeler.

In one general embodiment, a computer-implemented method includes identifying features of a plurality of data instances within a target domain; assigning weights to the plurality of data instances within the target domain, based on similarities among the features; selecting a subset of the plurality of data instances within the target domain, based on the weights; associating expert annotations with respective ones of data instances within the subset; and training a machine learning algorithm, utilizing the subset of the plurality of data instances and associated expert annotations.

In another general embodiment, a computer program product for implementing a domain adaptive semantic role labeler includes a computer readable storage medium having program instructions embodied therewith, where the computer readable storage medium is not a transitory signal per se, and where the program instructions are executable by a processor to cause the processor to perform a method including identifying, utilizing the processor, features of a plurality of data instances within a target domain; assigning, utilizing the processor, weights to the plurality of data instances within the target domain, based on similarities among the features; selecting, utilizing the processor, a subset of the plurality of data instances within the target domain, based on the weights; associating, utilizing the processor, expert annotations with respective ones of data instances within the subset s; and training, utilizing the processor, a machine learning algorithm, utilizing the subset of the plurality of data instances and associated expert annotations.

In another general embodiment, a computer-implemented method includes calibrating source domain data, thereby providing an indication of the degree of relevance of each data point to a target domain, by assigning weights to instances in the source domain according to how well they agree with corresponding usage in the target domain; assigning weights for source domain instances having overlapping features with target domain instances; assigning weights for source domain instances by propagating weights from other source domain instances sharing similar features; actively selecting target specific data for human annotation by selecting a subset of unlabeled target domain data that cover unseen features in labeled data, are associated with more data instances in target domain data, and are not redundant with source domain training data; requesting that annotators label the selected target specific data; combining the calibrated source domain data and labeled target specific data, thereby forming combined training data that are suitable for training a semantic role labeler (SRL); and training the SRL on the combined training data.

Figure 1:
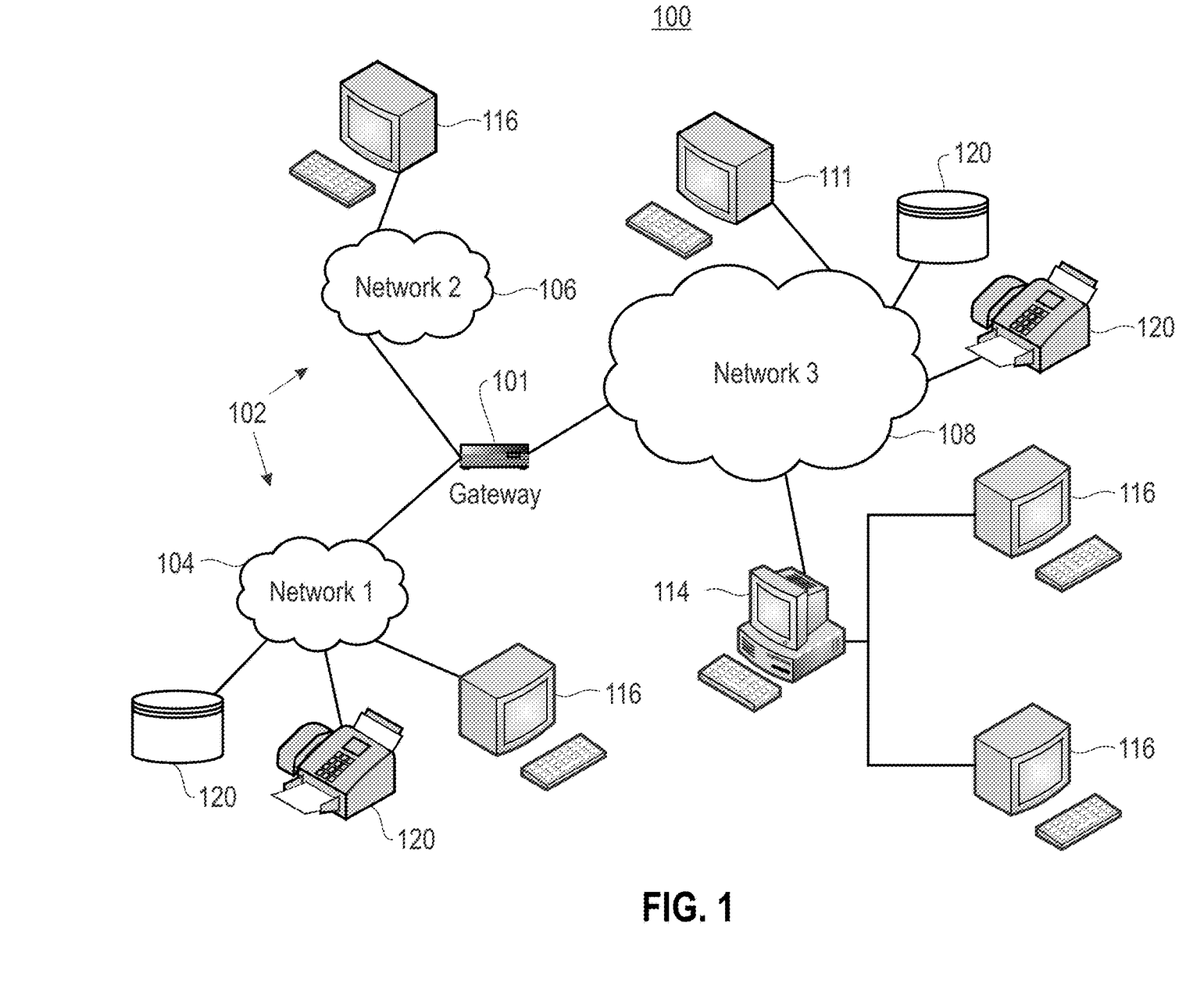
FIG. 1 illustrates a network architecture, in accordance with one embodiment of the present invention.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
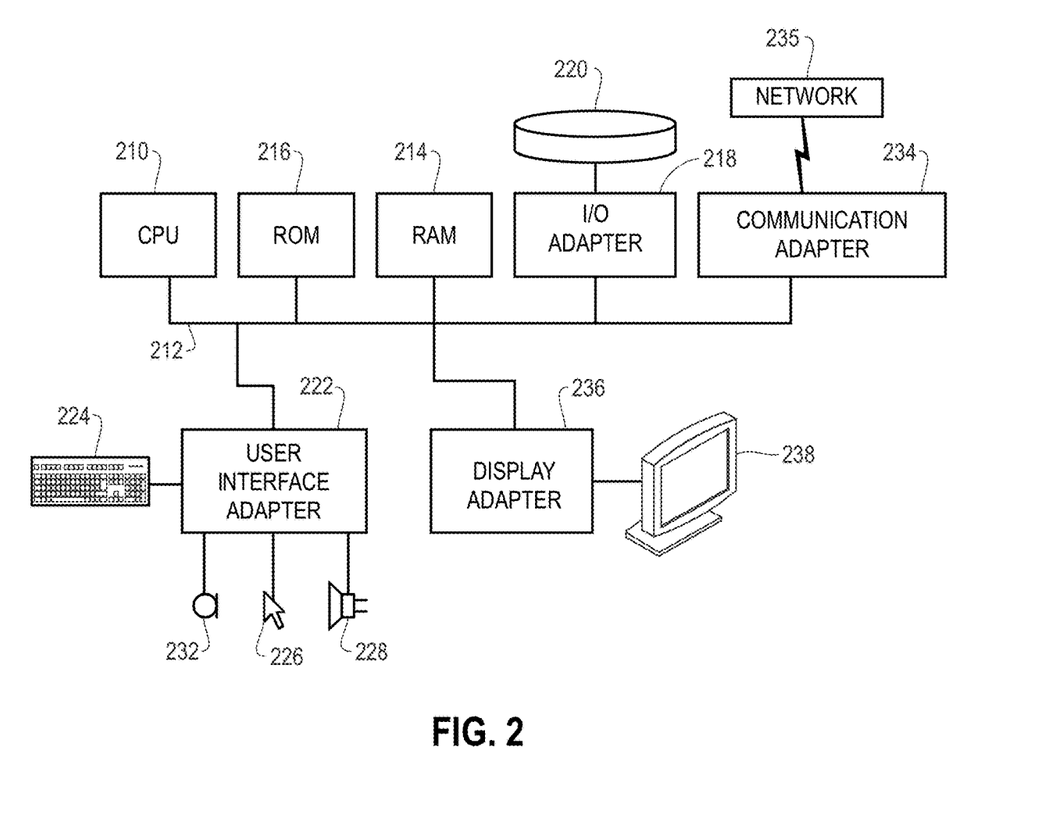
FIG. 2 shows a representative hardware environment that may be associated with the servers and/or clients of FIG. 1, in accordance with one embodiment of the present invention.

FIG. 2 shows a representative hardware environment associated with a user device 116 and/or server 114 of FIG. 1, in accordance with one embodiment. This figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
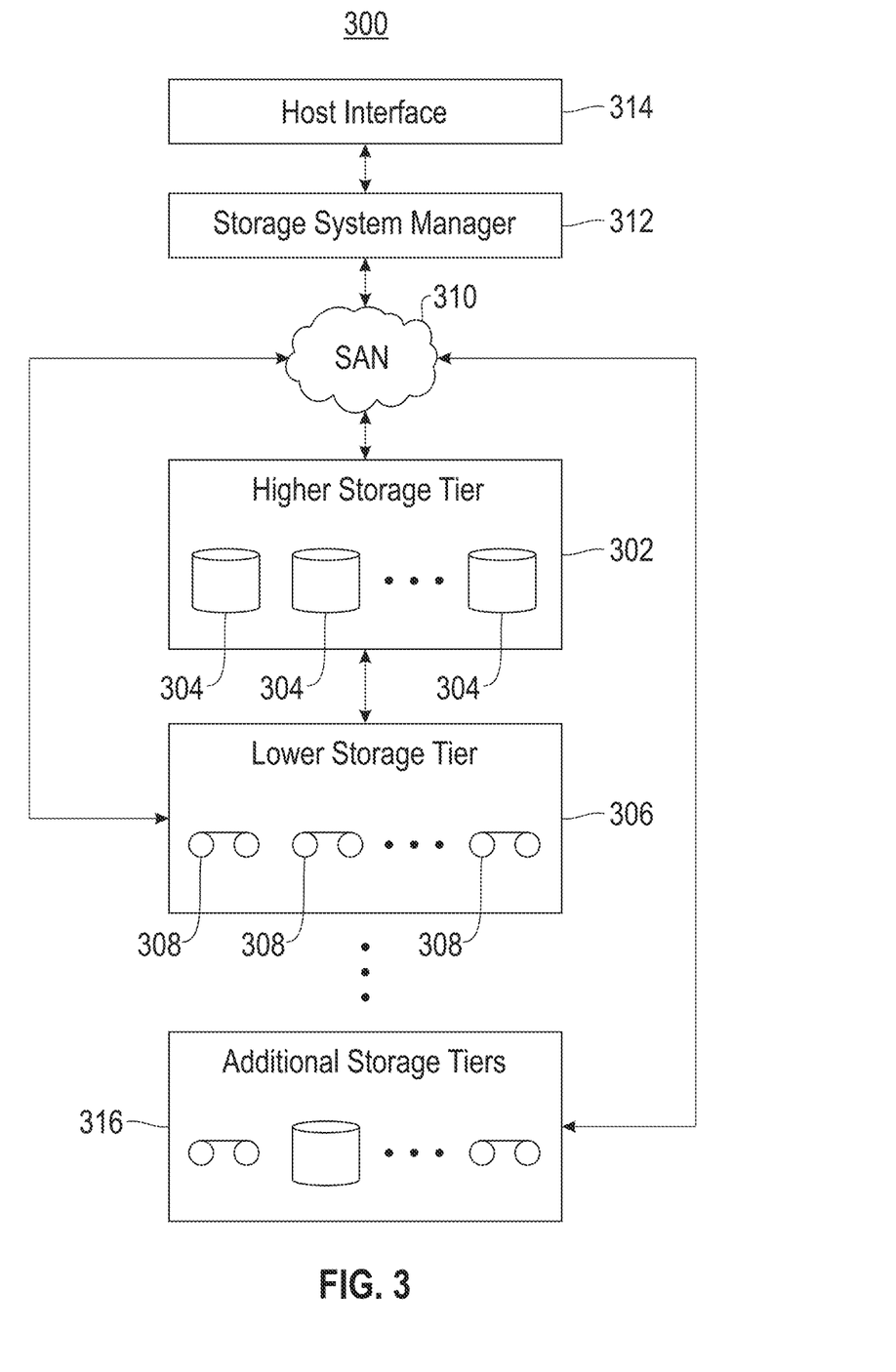
FIG. 3 illustrates a tiered data storage system in accordance with one embodiment of the present invention.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302 may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

Figure 4:
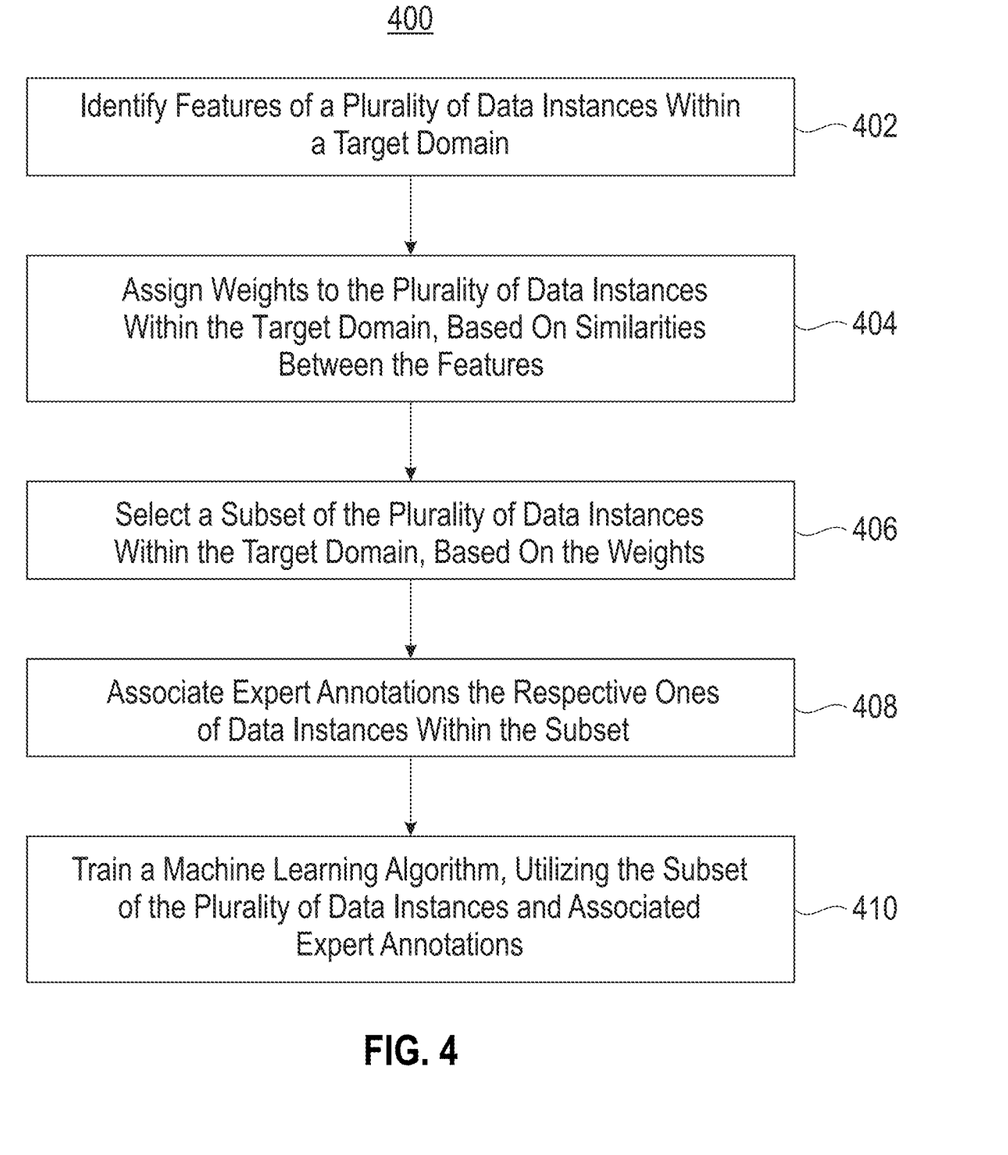
FIG. 4 illustrates a method for implementing a domain adaptive semantic role labeler, in accordance with one embodiment of the present invention.

Now referring to FIG. 4, a flowchart of a method 400 is shown according to one embodiment. The method 400 may be performed in accordance with the present invention in any of the environments depicted in FIGS. 1-3 and 6, among others. Of course, greater or fewer operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where features of a plurality of data instances within a target domain are identified. In one embodiment, the target domain may include a corpus of textual documentation. For example, the target domain may include one or more textual documents that include a plurality of textual data (e.g., in the form of sentences, etc.).

Additionally, in one embodiment, the target domain may include a specific contextual field associated with the textual documents. For example, the target domain may include a medical domain (that includes medical documents), an automotive domain (that includes automotive documents), etc. In another embodiment, the target domain may be differentiated from a source domain, which may include a generalized corpus of textual documentation that does not fall under a specific contextual field. For example, the source domain may include random web content, random newspaper content, etc.

Further, in one embodiment, each of the plurality of data instances may include at least a portion of a sentence within the target domain. For example, each data instance may include a specific instance of a predicate (e.g., a verb) argument structure and one or more roles associated with the predicate (e.g., words associated with the predicate within the sentence, etc.).

Further still, in one embodiment, each of the plurality of data instances within the target domain may be unlabeled. For example, labeled data instances may each include an annotation of the predicate argument structure within the instance. In another example, the annotation may include an indication of who performs the predicate, what is being acted on by the predicate, when the action is being performed, where the action is being performed, how the action is being performed, etc. In yet another example, this annotation may not be present in the plurality of data instances within the target domain.

Also, in one embodiment, the features of the plurality of data instances may include domain-independent characteristics of the plurality of data instances. For example, the features for a data instance may include an identification of a part of speech of every word/token within the data instance. In another embodiment, the features of the plurality of data instances may be identified by performing a first-level syntactic analysis of each of the data instances. In yet another embodiment, the features may include atomic semantic role labeling (SRL) features.

In addition, method 400 may proceed with operation 404, where weights are assigned to the plurality of data instances within the target domain, based on similarities among the features. In one embodiment, features of the plurality of data instances within the target domain may be compared to each other to determine the similarities between the features of various data instances.

Furthermore, in one embodiment, a first data instance within the target domain may have a first number of features that are shared with (e.g., that match) other data instances within the target domain. In another embodiment, a second data instance within the target domain may have a second number of features that are shared with other data instances within the target domain. In yet another embodiment, the first data instance may be assigned a higher weight value than the second data instance in response to determining that the first number is greater than the second number.

In this way, a first data instance within the target domain that has a higher weight than a second data instance may have more elements in common with other instances within the target domain, and may therefore be more relevant to the target domain, when compared to the second data instance. This may enable the determination of relevant data instances and features within the target domain.

Further still, in one embodiment, a weight may be assigned to each of the plurality of data instances within the target domain. In another embodiment, the weight may include a numerical value.

Also, method 400 may proceed with operation 406, where a subset of the plurality of data instances within the target domain is selected, based on the weights. In one embodiment, a subset of the plurality of data instances within the target domain having weights above a predetermined numerical threshold may be selected.

Additionally, in one embodiment, this subset may be refined by comparing instances in the subset to a plurality of instances in a source domain to determine similarities between the instances. For example, the source domain may include a generalized corpus of textual documentation that does not fall under a specific contextual field.

Further, in one embodiment, each of the plurality of instances in the source domain may be labeled. For example, each of the plurality of instances in the source domain may include an annotation of the predicate argument structure within the instance. In another embodiment, instances within the subset having more than a predetermined threshold number of features in common with instances in the source domain may be identified. For example, the identified instances may be removed from the subset to create the refined subset. This may minimize the number of instances within the subset that already have labels within the source domain.

In this way, the subset may include instances within the target domain that have a strong relationship with the target domain, and a weak relationship with the source domain.

Further still, method 400 may proceed with operation 408, where expert annotations are associated with respective ones of data instances within the subset. In one embodiment, the refined subset of the plurality of data instances may be sent to one or more domain experts within the target domain. In another embodiment, the domain experts may analyze each data instance within the refined subset to determine annotations (e.g., labels) for each data instance within the refined subset. For example, each expert annotation may include an annotation of the predicate argument structure within the instance.

Also, in one embodiment, the expert annotation for each instance may be determined manually or automatically. For example, the domain experts may include one or more users having knowledge of the target domain, one or more neural networks trained to perform labelling within the context of the target domain, etc. In another embodiment, the expert annotations may then be received from the domain experts, and each annotation may be linked to its associated data instance (e.g., utilizing metadata, pointers, etc.).

In this way, each data instance within the refined subset may obtain an associated label, thereby creating a corpus of labeled data instances for the target domain.

In addition, method 400 may proceed with operation 410, where a machine learning algorithm is trained, utilizing the subset of the plurality of data instances and associated expert annotations. In one embodiment, the machine learning algorithm may include a neural network (e.g., a deep neural network (DNN), etc.). In another embodiment, the machine learning algorithm may label predicate argument structures.

For example, the machine learning algorithm may take the predicate argument structure of a sentence as input, and may output an annotation of the predicate argument structure. In another example, the input may be selected from the target domain.

Furthermore, in one embodiment, the results of the machine learning algorithm may be used to perform semantic role labeling (SRL), natural language processing (NLP), etc. In another embodiment, the machine learning algorithm may be trained to (i) take each data instance of the subset of the plurality of data instances as input, and (ii) output the associated expert annotations. In yet another embodiment, labeled data instances within the source domain may also be used to train the machine learning algorithm with the subset of the plurality of data instances and associated expert annotations from the target domain.

Further still, in one embodiment, the subset of the plurality of data instances and associated expert annotations within the target domain may be compared to labeled data instances within the source domain. For example, data instances within the target domain may be prioritized over similar data instances within the source domain. In another example, if a data instance within the target domain matches a data instance within the source domain, the expert annotation for the data instance within the target domain may be weighted higher than the annotation/label for the matching data instance within the source domain. In this way, priority may be given to target domain-specific annotations while training the machine learning algorithm.

In this way, unlabeled data instances within a target domain may be filtered to determine the most relevant data instances for which a label is to be obtained. This may reduce the amount of data instances to be labeled within the target domain, and may increase the effectiveness of the resulting training data by maximizing the relevance of the training data to the target domain (thereby fine-tuning the machine learning algorithm to the target domain). A machine learning algorithm may therefore be trained using target domain-specific training data that has an optimized relevance to the domain, which may improve the performance of a computing device implementing such training. Likewise, the amount of bandwidth and associated computing resources necessary to perform data instance labeling may be minimized by reducing the amount of the data instances to be labeled, which may improve the performance of computing devices relying on such computing resources.

Figure 5:
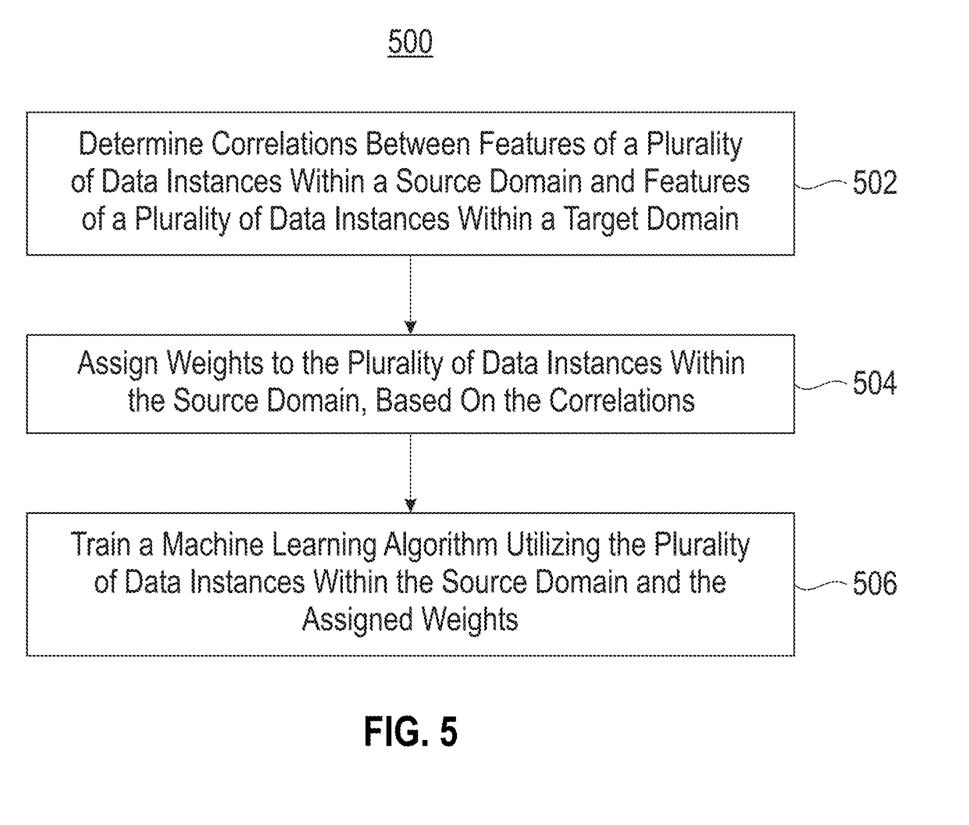
FIG. 5 illustrates a method for training a machine learning algorithm with weighted source domain data, in accordance with one embodiment of the present invention.

Now referring to FIG. 5, a flowchart of a method 500 for training a machine learning algorithm with weighted source domain data is shown according to one embodiment. The method 500 may be performed in accordance with the present invention in any of the environments depicted in FIGS. 1-3 and 6, among others. Of course, greater or fewer operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where correlations between features of a plurality of data instances within a source domain and features of a plurality of data instances within a target domain are determined. In one embodiment, each of the plurality of data instances within the source domain may be labeled. For example, each of the data instances within the source domain may include an annotation of the predicate argument structure within the instance.

Additionally, in one embodiment, each of the plurality of data instances within the target domain may be labeled. For example, the plurality of data instances within the target domain may include the refined subset of the plurality of data instances determined in FIG. 4. In another embodiment, the features of the plurality of data instances may include domain-independent characteristics of the plurality of data instances.

Further, in one embodiment, determining the correlations between the features may include comparing the features of the plurality of data instances within the source domain and the features of the plurality of data instances within the target domain to determine an argument feature distribution for each of the data instances within the source domain. For example, the argument feature distribution may include an analysis of a distribution of the features, as well as the similarity of the features between the data instances of the source and target domains.

Further still, method 500 may initiate with operation 504, where weights are assigned to the plurality of data instances within the source domain, based on the correlations. In one embodiment, within the source domain, a first data instance may have a first level of similarity of argument feature distribution with data instances within the target domain. In another embodiment, a second data instance may have a second level of similarity of argument feature distribution with data instances within the target domain. In yet another embodiment, the first data instance may be assigned a greater weight value than the second data instance in response to determining that the first level of similarity is greater than the second level of similarity.

In one embodiment, weights may be increased for one or more of the plurality of data instances within the source domain that have overlapping features with data instances within the target domain. In another embodiment, a weight for an unweighted data instance within the source domain may be set to match a weight for a weighted data instance within the source domain that shares similar features. In this way, weighting may be performed in a more efficient manner.

Also, method 500 may initiate with operation 506, where a machine learning algorithm is trained utilizing the plurality of data instances within the source domain and the assigned weights. In one embodiment, the machine learning algorithm may include a neural network (e.g., a deep neural network (DNN), etc.). In another embodiment, the machine learning algorithm may label predicate argument structures.

In addition, in one embodiment, the machine learning algorithm may be trained to take the each of the plurality of data instances within the source domain as input, and to output the associated labels for the data instances. In another embodiment, the refined subset of the plurality of data instances and associated expert annotations from the target domain determined in FIG. 4 may also be used to train the machine learning algorithm with the labeled and weighted data instances within the source domain. In yet another embodiment, during the training, data instances having higher weights may be emphasized over data instances having lower weights.

In this way, the source domain-based training data may be weighted based on relevance to target domain data. This may improve the performance of machine learning algorithm when performing labelling of unlabeled data from the target domain.

Active Domain Adaptation for Semantic Role Labeling

Semantic role labeling (SRL) involves annotating predicate argument structures in sentences. This is an important part of many natural language processing (NLP) tasks. Although SRL has been extensively studied for the general domain and performs well for general test sets, its performance is usually unsatisfactory on low-resource domains where abundant training data are not available. Most existing SRL systems trained for a general domain do not perform well on specific low resource domains. The SRL systems trained for specific domains data alone usually do not generalize well. The issue of utilizing the abundant general domain data while also making focused use of special domain data has not previously been adequately addressed.

One challenge in performing SRL on low resource/special domains is the lack of training data and the overhead associated with obtaining the training data for new/low resource domains. Another challenge is that SRL does not generalize well to new domain sentences with shallow semantic information.

These challenges are addressed by using weighting and coverage mechanisms. By assigning appropriate weights to data points from both the general and the specific domain, the general domain data are used for broad coverage to guard against overfitting, while making sufficient use of special domain data for usages that are different from the general domain.

The domain adaptive system adapts an SRL model to a new domain which may not have a large amount of training data. This is achieved by:

1. Making use of data from both the source domain and the target domain in a strategic way, so that the training set as a whole helps promote overall robustness of the machine learning model while also adapting and performing to data that are less common 2. Probabilistically instantiating weights for source domain data points based on label distribution in the target domain 3. Selecting only those instances from the source domain that have been weighted to be reliable on the target domain 4. Maximizing coverage by these instances by defining an objective function that characterizes the association of the selected instances with unseen/rare features and the association of such features with more data points in the target domain 5. Providing an end-to-end architecture that goes from separate datasets to a set of data instances that are reliable to adapt the machine learning model with composite features to new domains Unlike other solutions, the current system:

1. Avoids a large outlay of time and resources to collect data from a new domain 2. Has a budgeted oracle that reduces time and resources spent in obtaining training instances for a new domain by strategically using the available amount of data from the new domain and still picking reliable instances from a larger and more easily available general domain 3. Does not disregard less frequent labels as noise and instead adapts the system to predict them correctly 4. Updates domain-specific usage and argument label distribution of certain verbs that are important to the domain while maintaining general usage and argument label distribution of general verbs 5. Helps the SRL system realize rare usages of frames for some verbs and roles for some arguments by providing enough data instances with those usages to the system Domain Adaptive Semantic Role Labelling SRL trained on general domain data alone do not work well on special domains. More specifically, the SRL lacks an understanding of special meanings for domain specific word usage. Also, an SRL trained on special domain data alone does not generalize well—it suffers from sparse data and lacks general usage patterns. However, there is a high time and processing cost associated with generating special domain data.

To solve the above problems, the most frequent and most relevant predicates in the domain are identified. A higher relevance is assigned to low frequency features which are still relevant to the domain. A model is actively adapted to work well for both low frequency and high frequency features that are of relevance to the specific domain.

This implementation avoids a need to acquire large amounts of domain specific data by utilizing general domain data which are already present in large amounts. The implementation also utilizes a larger set of composite features that are truly representative of different contexts of predicate usage in the domain.

In one embodiment, given a corpus of labeled source domain data and unlabeled target domain data, as well as access to annotators (e.g., human or programmatic annotators with a limited cost budget), reliable training data may be output for an SRL labeler that is directed towards the target domain.

In another embodiment, the following steps may be iteratively performed to create training data for the SRL labeler:

1. Calibrate source domain data for domain adaptation

Figure 6:
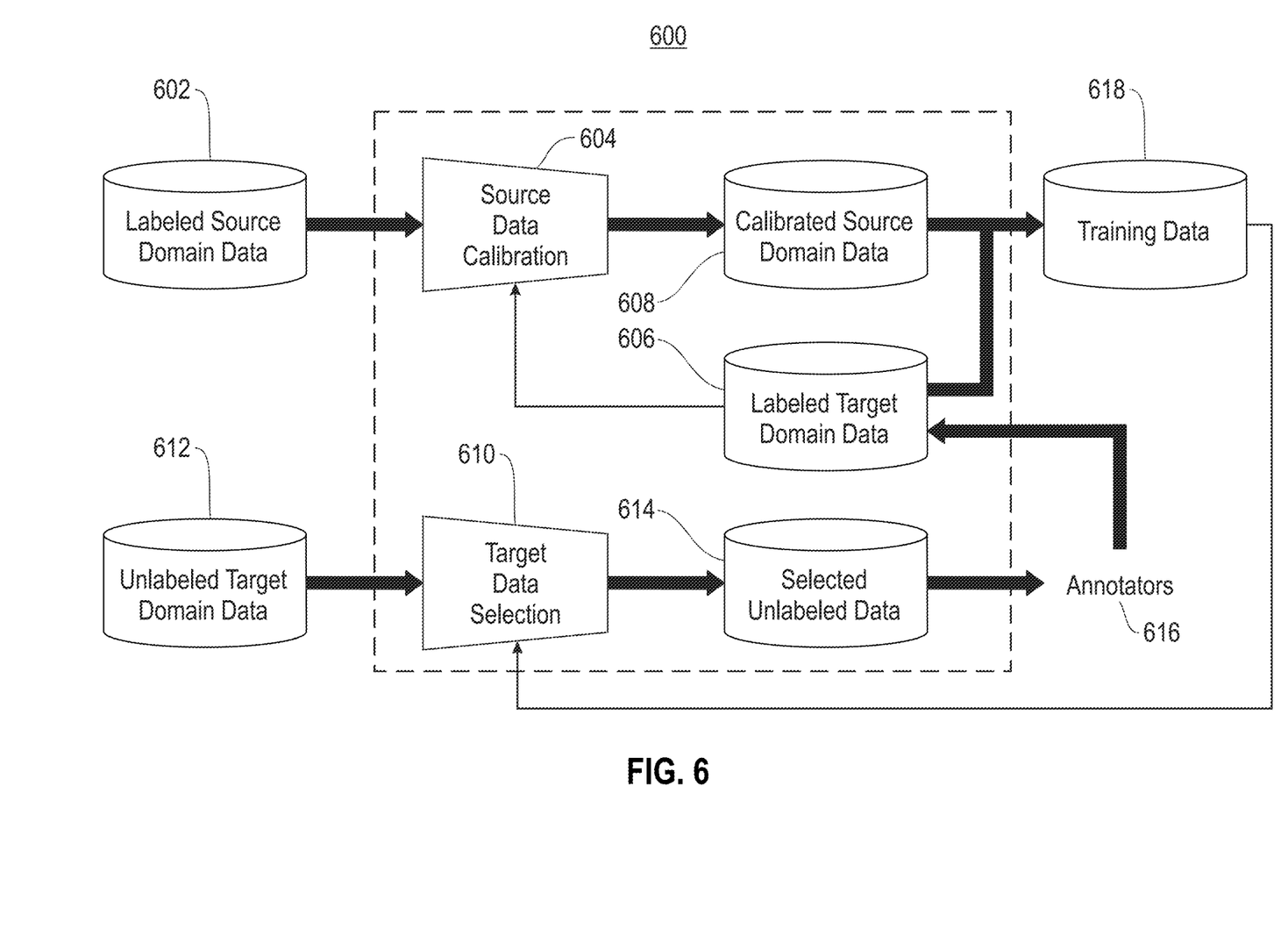
FIG. 6 illustrates an exemplary training data creation framework, in accordance with one embodiment of the present invention.

Assign instances in the source domain different weights according to how well they agree with target domain data labels Instantiate weights for source domain instances that directly have common features with target domain instances or propagate trust from other source domain instances 2. Actively select target specific data for active learning Select a subset of unlabeled target domain data that:
covers as much unseen features in the labeled data as possible
are associated with more data instances in target domain data
are not redundant with source domain training data 3. Ask annotators to label the selected target domain data 4. Merge the calibrated source domain data and the labeled target domain data (initially empty) as the training data for the SRL labeler FIG. 6 illustrates an exemplary training data creation framework 600, according to one exemplary embodiment. As shown, calibration 604 is performed on labeled source domain data 602 to create calibrated source domain data 608, utilizing the labeled source domain data 602 and labeled target domain data 606.

For example, calibration 604 may include assigning weights to instances of labeled source domain data 602 according to how well they agree with a corresponding usage in the labeled target domain data 606. In another example, calibration 604 may include assigning weights to instances of the labeled source domain data 602 having overlapping features with instances of the labeled target domain data 606.

In yet another example, calibration 604 may include assigning weights to instances of the labeled source domain data 602 by propagating weights from other instances of the labeled source domain data 602 that share one or more similar features. Also, the calibrated source domain data 608 may be added to a corpus of training data 618.

Additionally, target data selection 610 is performed on unlabeled target domain data 612 to determine selected unlabeled target domain data 614 for which annotation 616 is to be performed. In one embodiment, during target data selection 610, instances within the unlabeled target domain data 612 may be selected that cover unseen features in the labeled source domain data 602, are associated with more data instances in the unlabeled target domain data 612, and are not redundant with source domain data 608 added to the corpus of training data 618.

Further, once annotation 616 has been performed on the selected unlabeled target domain data 614 to create the labeled target domain data 606, the labeled target domain data 606 are then added to the corpus of training data 618.

In one embodiment, the relevance score (w) of source domain instances to a target domain may be calculated. For example, for the selected and labeled target domain instances, assign a weight w=1. For source domain instances having overlapping features with target domain instances, assign the weight w based on the weight w of relevant target domain instances.

For example, a prior relevance of source instances may be assumed. It may also be assumed that the probability of labels for relevant instances equals the average over those of related instances weighted by a similarity kernel. It may also be assumed that the probability of labels for irrelevant instances equals the unconditional distribution over the source domain. Also, the threshold probability needed for a label of an instance for that instance to be considered relevant may be calculated.

For source domain instances having no overlapping features with target domain instances, the weight w may be assigned by a weighted average over w for source domain instances based on their overlapping features.

For example, a set of instances i' sharing a common feature j may be determined. An average of w over i' may be calculated. An average of these averages over all the features j may then be calculated.

In another embodiment, important predicates may be selected. For example, domain experts may select predicates relevant to the domain. These predicated may have more target-domain-specific usage than source-domain-specific usage. In yet another embodiment, coverage of target domain argument labels may be extended.

For example, given features covered by labeled data from a source or target domain, features (e.g., a composite of standard atomic SRL features) may be selected from labeled data that have a low frequency in the source labelled data, have high frequency association with target domain instances based on the features in the current training data, and have higher weights from the calibration step.

In one embodiment, instances are selected that are both representative (e.g., similar to other instances in the specific domain corpus) and informative (e.g., different from already labeled instances). If an instance is labeled, other instances with similar features can also be accurately predicted (e.g., "covered"). In this way, a set of <k sentences may be determined that maximize the "coverage."

Figure 7:
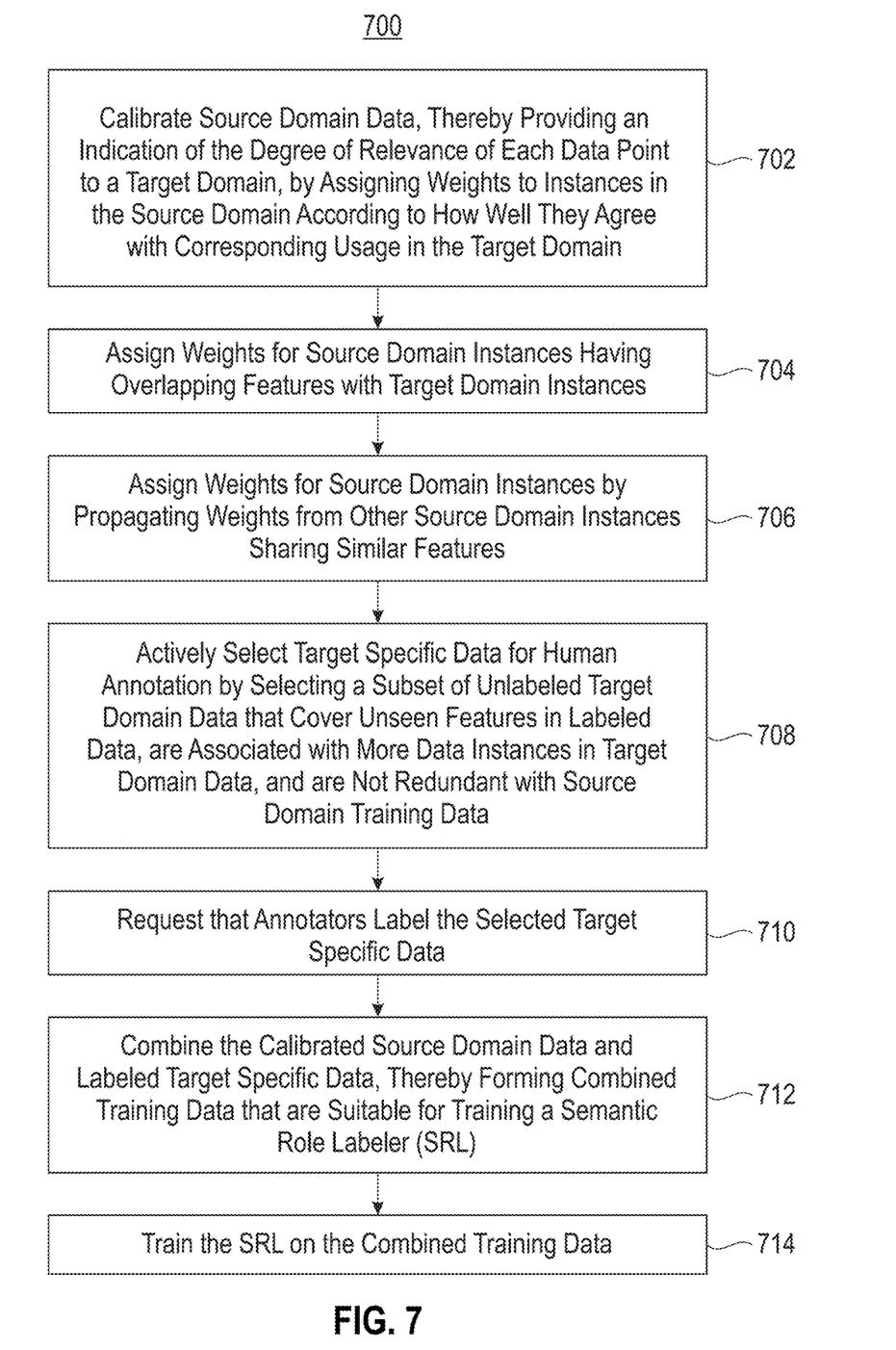
FIG. 7 illustrates a method for creating training data from labeled source domain data and unlabeled target domain data, in accordance with one embodiment of the present invention.

Now referring to FIG. 7, a flowchart of a method 700 for creating training data from labeled source domain data and unlabeled target domain data are shown according to one embodiment. The method 700 may be performed in accordance with the present invention in any of the environments depicted in FIGS. 1-3 and 6, among others. Of course, greater or fewer operations than those specifically described in FIG. 7 may be included in method 700, as would be understood by one of skill in the art upon reading the present descriptions.

Each of the steps of the method 700 may be performed by any suitable component of the operating environment. For example, in various embodiments, the method 700 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 700. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 7, method 700 may initiate with operation 702, where source domain data are calibrated, thereby providing an indication of the degree of relevance of each data point to the target domain, by assigning weights to instances in the source domain according to how well they agree with corresponding usage in the target domain.

Additionally, method 700 may proceed with operation 704, where weights are assigned for source domain instances having overlapping features with target domain instances. Further, method 700 may proceed with operation 706, where weights for source domain instances are assigned by propagating weights from other source domain instances sharing similar features.

Further, method 700 may proceed with operation 708, where target specific data for human annotation are actively selected by selecting a subset of unlabeled target domain data that cover unseen features in the labeled data, are associated with more data instances in target domain data and are not redundant with source domain training data.

Further still, method 700 may proceed with operation 710, where annotators are requested to label the selected target domain data. Also, method 700 may proceed with operation 712, where the calibrated source domain data and the labeled target domain data are combined, thereby forming training data that are suitable for training a semantic role labeler (SRL).

In addition, method 700 may proceed with operation 714, where the SRL is trained on the combined data.

In one embodiment, operations 702-714 are iterated until an acceptable SRL quality on target domain is achieved. In another embodiment, a subset of the target domain data may be identified as being relevant to the target domain (e.g., "important predicates"), based on input from one or more experts. In another embodiment, the SRL may include any classification model.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   identifying features of a plurality of data instances within a target domain;
   assigning weights to the plurality of data instances within the target domain, based on similarities among the features;
   selecting a subset of the plurality of data instances within the target domain, based on the weights;
   requesting and receiving expert annotations for each of the plurality of data instances within the subset;

associating the expert annotations with respective ones of data instances within the subset; and training a machine learning algorithm, utilizing the subset of the plurality of data instances and associated expert annotations.

2. The computer-implemented method of claim 1, further comprising:

determining correlations between (i) features of the plurality of data instances within a source domain and (ii) the features of the plurality of data instances within the target domain;

assigning weights to the plurality of data instances within the source domain, based on the correlations; and training the machine learning algorithm, utilizing the plurality of data instances within the source domain and the weights.

3. The computer-implemented method of claim 1, wherein each of the plurality of data instances includes a specific instance of (i) a predicate argument structure and (ii) one or more roles associated with a predicate.

4. The computer-implemented method of claim 1, wherein each of the plurality of data instances within the target domain is unlabeled.

5. The computer-implemented method of claim 1, wherein the features of the plurality of data instances include domain-independent characteristics of the plurality of data instances.

6. The computer-implemented method of claim 1, wherein the features of each of the plurality of data instances include an identification of a part of speech of every word within the data instance.

7. The computer-implemented method of claim 1, wherein features of the plurality of data instances within the target domain are compared to each other to determine similarities between the features.

8. The computer-implemented method of claim 1, wherein:

a first data instance within the target domain has a first number of features that match other data instances within the target domain;

a second data instance within the target domain has a second number of features that match other data instances within the target domain; and the first data instance is assigned a higher weight value than the second data instance, in response to determining that the first number of features is greater than the second number of features.

9. The computer-implemented method of claim 1, wherein a subset of the plurality of data instances within the target domain having weights above a predetermined numerical threshold is selected.

10. The computer-implemented method of claim 1, wherein the subset of the plurality of data instances is refined by comparing instances in the subset to a plurality of instances in a source domain to determine similarities between the instances, where:

instances within the subset having more than a predetermined threshold number of features in common with instances in the source domain are identified, and the identified instances are removed from the subset to create a refined subset.

11. The computer-implemented method of claim 1, wherein labeled data instances within a source domain are also used to train the machine learning algorithm with (i) the subset of the plurality of data instances and (ii) the associated expert annotations from the target domain.

12. The computer-implemented method of claim 1, wherein the machine learning algorithm labels predicate argument structures.

13. The computer-implemented method of claim 1, wherein results of the machine learning algorithm are used to perform semantic role labeling (SRL).

14. The computer-implemented method of claim 1, wherein the machine learning algorithm is trained to (i) take each data instance of the subset of the plurality of data instances as input and (ii) output the associated expert annotations.

15. A computer program product comprising one or more computer readable storage media, and program instructions collectively stored on the one or more computer readable storage media, the program instructions comprising instructions configured to cause one or more processors to perform a method comprising:

identifying, utilizing the one or more processors, features of a plurality of data instances within a target domain;

assigning, utilizing the one or more processors, weights to the plurality of data instances within the target domain, based on similarities among the features;

selecting, utilizing the one or more processors, a subset of the plurality of data instances within the target domain, based on the weights;

requesting and receiving, utilizing the one or more processors, expert annotations for each of the plurality of data instances within the subset;

associating, utilizing the one or more processors, the expert annotations with respective ones of data instances within the subset; and training, utilizing the one or more processors, a machine learning algorithm, utilizing the subset of the plurality of data instances and associated expert annotations.

16. The computer program product of claim 15, wherein each of the plurality of data instances within the target domain is unlabeled.

17. The computer program product of claim 15, further comprising:

determining, utilizing the one or more processors, correlations between (i) features of the plurality of data instances within a source domain and (ii) the features of the plurality of data instances within the target domain;

assigning, utilizing the one or more processors, weights to the plurality of data instances within the source domain, based on the correlations; and training, utilizing the one or more processors, the machine learning algorithm, utilizing the plurality of data instances within the source domain and the weights.

18. The computer program product of claim 15, wherein each of the plurality of data instances includes a specific instance of (i) a predicate argument structure and (ii) one or more roles associated with a predicate.

19. A system, comprising:

a processor; and logic integrated with the processor, executable by the processor, or integrated with and executable by the processor, the logic being configured to:

identify features of a plurality of data instances within a target domain;

assign weights to the plurality of data instances within the target domain, based on similarities among the features;

select a subset of the plurality of data instances within the target domain, based on the weights;

request and receive expert annotations for each of the plurality of data instances within the subset;

associate the expert annotations with respective ones of data instances within the subset; and train a machine learning algorithm, utilizing the subset of the plurality of data instances and associated expert annotations.

20. The system of claim 19, wherein the machine learning algorithm is trained to (i) take each data instance of the subset of the plurality of data instances as input and (ii) output the associated expert annotations.

21. The system of claim 19, wherein a subset of the plurality of data instances within the target domain having weights above a predetermined numerical threshold is selected.

* * * * *